(12) United States Patent
Kuroda et al.

(10) Patent No.: US 6,644,817 B2
(45) Date of Patent: *Nov. 11, 2003

(54) PROJECTOR

(75) Inventors: Akitoshi Kuroda, Yamagata-mura (JP); Mutsuya Furuhata, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/138,502

(22) Filed: May 6, 2002

(65) Prior Publication Data

US 2002/0131025 A1 Sep. 19, 2002

Related U.S. Application Data

(62) Division of application No. 09/335,791, filed on Jun. 18, 1999, now Pat. No. 6,402,324.

(30) Foreign Application Priority Data

Jun. 23, 1998 (JP) .......................................... 10-176248

(51) Int. Cl.[7] .............................................. G03B 21/00
(52) U.S. Cl. ..................................................... 353/119
(58) Field of Search ............................. 353/119, 52, 57, 353/58, 61

(56) References Cited

U.S. PATENT DOCUMENTS 5,676,442 A * 10/1997 Fujimori ..................... 353/119
5,806,952 A * 9/1998 Fujimori ..................... 353/119
6,402,324 B1 * 6/2002 Kuroda et al. ................ 353/52

* cited by examiner

Primary Examiner—William Dowling
(74) Attorney, Agent, or Firm—Oliff & Berridge, PLC (57) ABSTRACT

A power supply unit is formed so as to be divided into first and second power supply blocks, which are disposed on both sides of a projecting lens. This allows the power supply blocks to be efficiently disposed in a projection display device, so that dead space is not easily formed in the projection display device, making it possible to reduce the size of the projection display device. First and second power supply block cooling paths are formed at first and second power supply blocks which are liable to generate heat, respectively. A light modulating system cooling path is formed at a light modulating system disposed at substantially the center of the projection display device. Therefore, even when these component parts are closely disposed in the projection display device of a compact size, proper cooling operations can be carried out, making it possible to cool the entire projection display device more efficiently.

7 Claims, 7 Drawing Sheets

PROJECTOR

BACKGROUND OF THE INVENTION

1. Field of Invention

The present invention relates to a projection display device, and, more particularly, to a technique for efficiently cooling the component parts in the projection display device, using cooling air.

2. Description of Related Art

Hitherto, a projection display device has been known, which consists of a lamp serving as a light source, an optical system for optically treating light beams emitted from the lamp to form an optical image based on image information, a projection lens for projecting the image formed by the optical system onto a projection surface in enlarged form, and an electrical power supply for supplying electrical power to drive the projection display device.

Projection display devices of this type are used widely in multimedia presentations given, for example, at conferences, academic societies, or exhibitions.

Although such projection display devices may be installed in, for example, conference rooms where presentations are given, there may be times when they are brought in from or transferred to another place and stored there. Therefore, there is a need to make the projection display devices highly portable so that they can be easily carried around. This is achieved by making the projection display devices compact in size.

When projection display devices are made compact in size, the various component parts thereof are disposed close together in the projection display devices, making it harder for the cooling air drawn in by a fan or the like to circulate. Thus, how cooling paths are formed becomes important in achieving proper cooling of any heated component part.

SUMMARY OF THE INVENTION

Accordingly, it is an object of the present invention to provide a projection display device which can be more easily reduced in size and which can achieve proper cooling of the interior thereof.

According to the present invention, there is provided a projection display device consisting of a light source; an optical system including a light modulating system that modulates light beams emitted from the light source to form an optical image in accordance with image information; a projecting lens that projects the image formed by the optical system onto a projection surface in enlarged form; a power supply that supplies electrical power to drive the projection display device, the power supply consisting of a plurality of spaced apart power supply blocks; a plurality of power supply block cooling paths respectively formed at the power supply blocks that respectively cool the power supply blocks; and a light modulating system cooling path that cools the light modulating system.

In the projection display device, the power supply, which is relatively large compared to the other component parts, is formed so as to be divided into a plurality of power supply blocks, which can be efficiently disposed in the projection display device. Therefore, dead space is not easily formed in the projection display device, so that it can be reduced in size. In addition, although the power supply blocks and, in particular, the light modulating system of the optical system tends to generate heat compared to the other component parts, a cooling path is formed for each power supply block as well as for the light modulating system so that they can be properly cooled, resulting in more efficient cooling of the entire projection display device. By virtue of the invention, the above-described object is achieved.

In the projection display device of the present invention, the light modulating system consists of a plurality of light modulators.

In the projection display device of the present invention, a light source driver board that drives the light source may be disposed in at least one of the plurality of power supply block cooling paths; a control circuit board that controls the entire projection display device may be disposed in another one of the plurality of power supply block cooling paths; and a modulator driver board that drives the light modulators of the light modulating system may be disposed in the light modulating system cooling path.

In this case, a pair of the modulator driver boards may be disposed so as to be spaced apart, a space between the pair of modulator driver boards forming a part of the light modulating system cooling path.

In the projection display device of the present invention, the power supply block cooling paths and the light modulating system cooling path may be formed so as to pass by the light source.

In the aforementioned forms of the projection display device of the present invention, a plurality of exhaust fans disposed on different rotational axial lines may be provided to remove cooling air circulating in the plurality of power supply block cooling paths and the light modulating system cooling path, and a temperature sensor disposed in at least one of the power supply block cooling paths and the light modulating system cooling path may be provided to control the plurality of exhaust fans based on detection results obtained by of the temperature sensor.

DETAILED DESCRIPTION OF PREFERRED EMBODIMENTS

A description will now be given of an embodiment of the present invention with reference to the drawings.

(1) Overall Structure of the Projection Display Device

Figure 1:
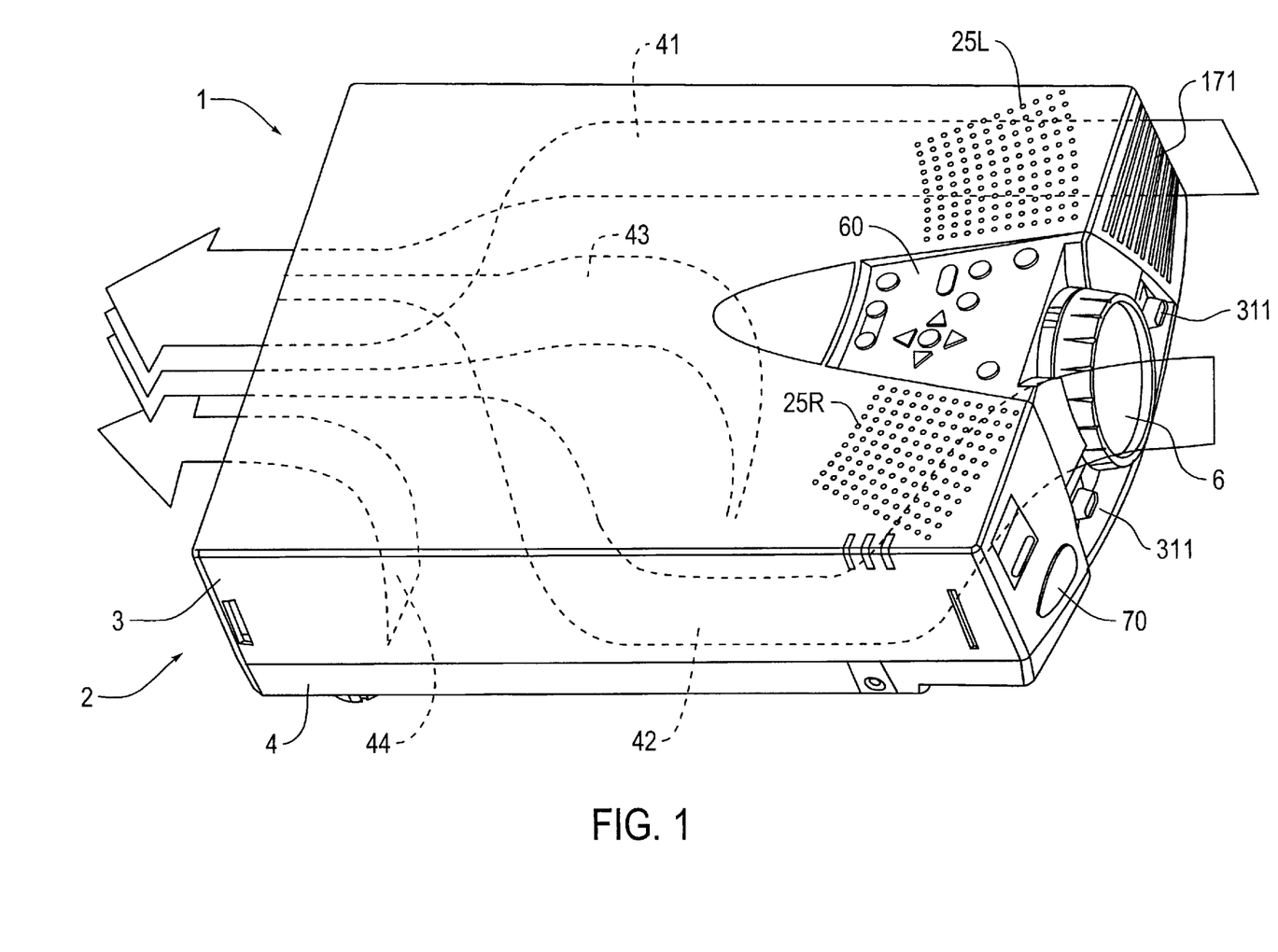
FIG. 1 is an external perspective view of an embodiment of the projection display device in accordance with the present invention, as seen from the top thereof.
Figure 2:
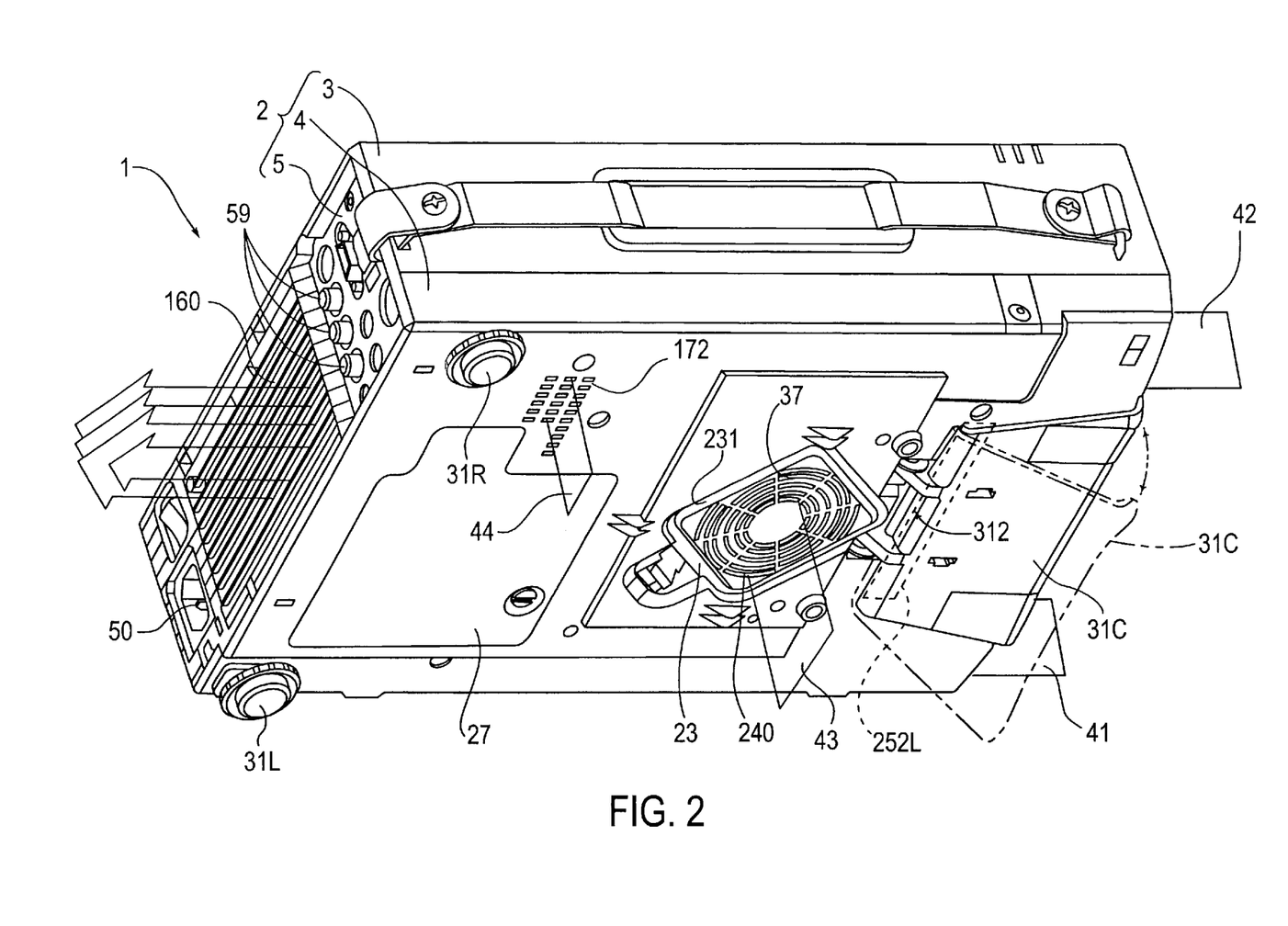
FIG. 2 is an external perspective view of the embodiment of the projection display device, as seen from the bottom thereof.

FIGS. 1 and 2 are perspective views schematically illustrating projection display device 1 of an embodiment as seen from the top surface side and the bottom surface side, respectively.

In the projection display device 1, light from a lamp serving as a light source is separated into light beams of the three primary colors, red (R), green (G), and blue (B). Each of the different color light beams passes through its corresponding liquid crystal light valve (or through a light modulating system), which modulates the light beams in accordance with image information. The modulated color light beams are then combined by a prism (or light combining system) for displaying an image in enlarged form on a projection surface through a projecting lens 6. Excluding the projecting lens 6 which has a portion thereof projecting from an outside case 2, all of the component parts are accommodated within the outside case 2.

(2) Construction of the Outside Case

In general, the outside case 2 consists of an upper case 3 which covers the top portion of the projection display device, a lower case 4 which forms the bottom portion of the projection display device, and a rear case 5 (FIG. 2) which covers the rear portion of the projection display device.

As shown in FIG. 1, a plurality of holes 25L and 25R are formed at the left and right ends of the front side of the top surface of the upper case 3. Operation switches 60 are provided between the holes 25L and the holes 25R in order to adjust, for example, the image quality produced by the projection display device 1. A light-receiver 70 is provided at the left lower portion of the front face of the upper case 3 in order to receive light signals from a remote controller that is not shown.

As shown in FIG. 2, on the bottom surface of the lower case 4, a lamp replacement cover 27 accommodated in the interior of the projection display device for replacement of a lamp unit 8 (described later), and an air filter cover 23 with an air intake 240 for cooling the interior of the projection display device are provided.

As shown in FIG. 2, on the bottom surface of the lower case 4, a foot 31C at substantially the center portion of the front end of the lower case 4, and a foot 31R and a foot 31L at the right and left corners of the rear end of the lower case 4 are provided. When the lever 311 shown in FIG. 1 is pulled upward, a rotational mechanism 312 (FIG. 2) behind the lever 311 causes the foot 31C to rotate and to be biased so that the front side thereof separates from the projection display device body, as indicated by the alternate long and two short dashed lines of FIG. 2. By adjusting the amount of rotation, the vertical position of the display screen at the projection plane can be changed. The foot 31R and the foot 31L are formed such that they can be rotated inward and outward, making it possible to change the tilt of the display screen by adjusting the amount by which they are rotated inward and outward.

As shown in FIG. 2, on the rear case 5, a group 51 of various input and output terminals and an AC inlet 50 for supplying external electrical power are formed, with an exhaust port 160 being formed adjacent to the input and output terminal group 51 in order to discharge air from the interior of the projection display device.

(3) Internal Structure of the Projection Display Device

Figure 3:
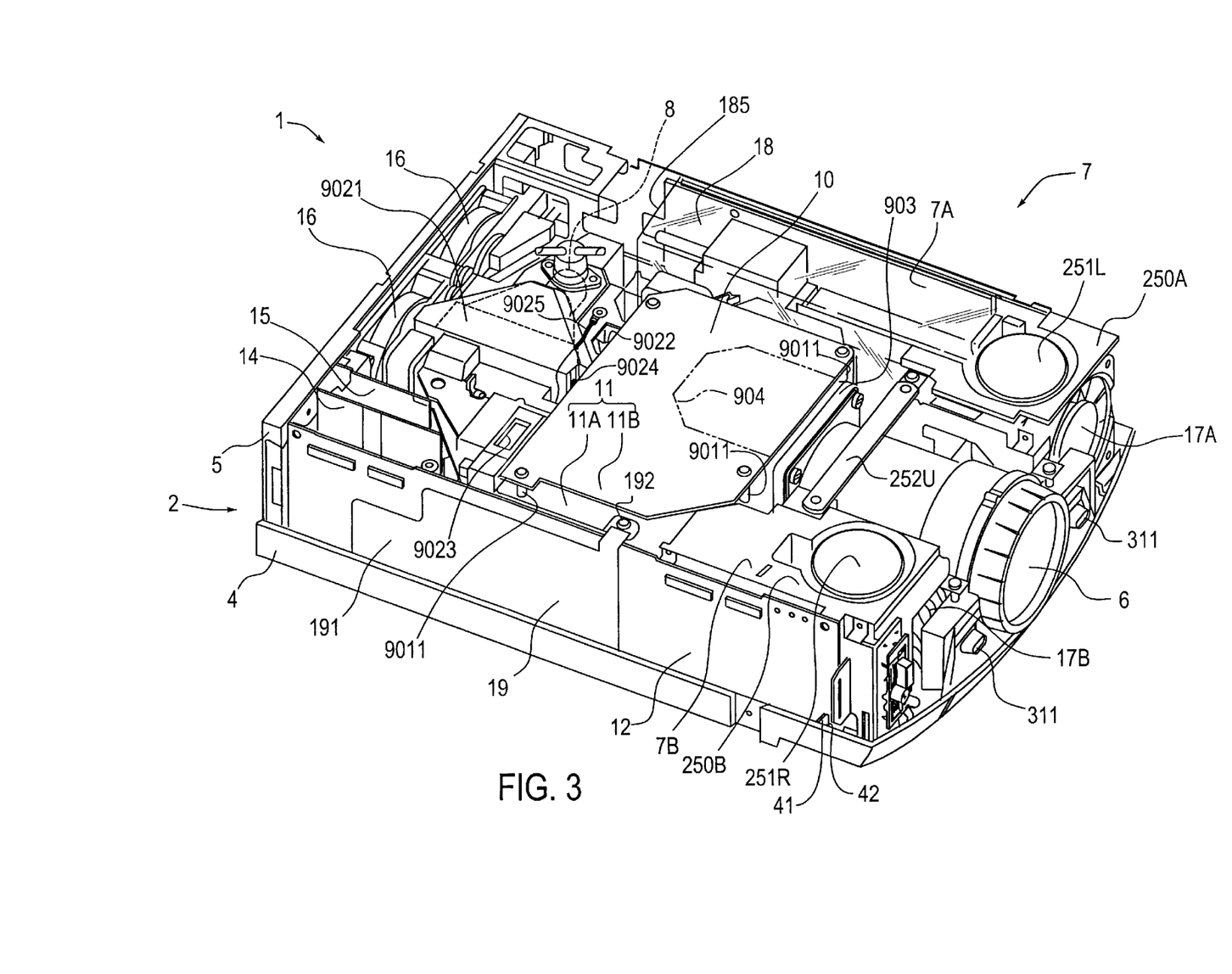
FIG. 3 is a perspective view of the internal structure of the projection display device of the embodiment.
Figure 4:
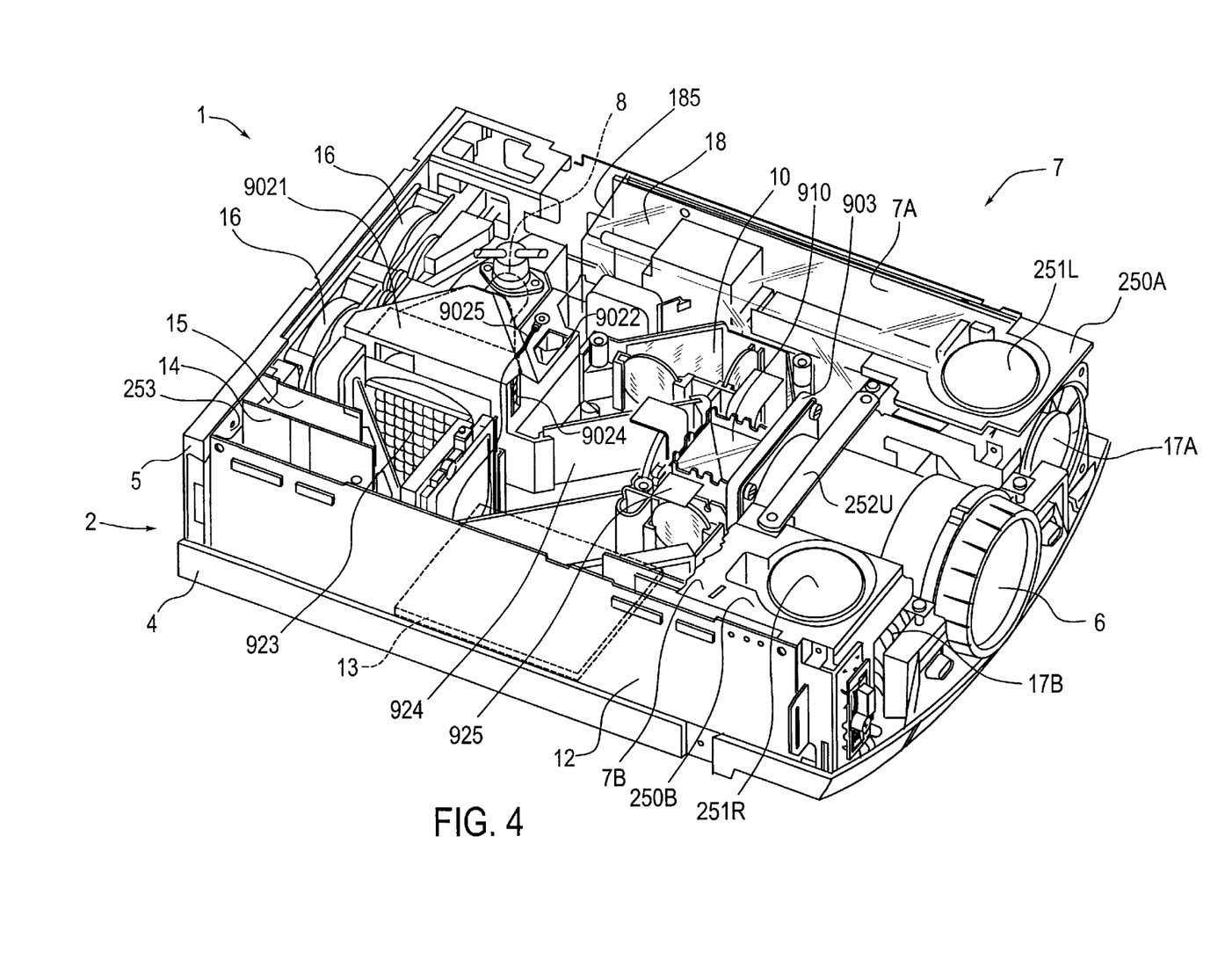
FIG. 4 is a perspective view of the optical system in the projection display device of the embodiment.
Figure 5:
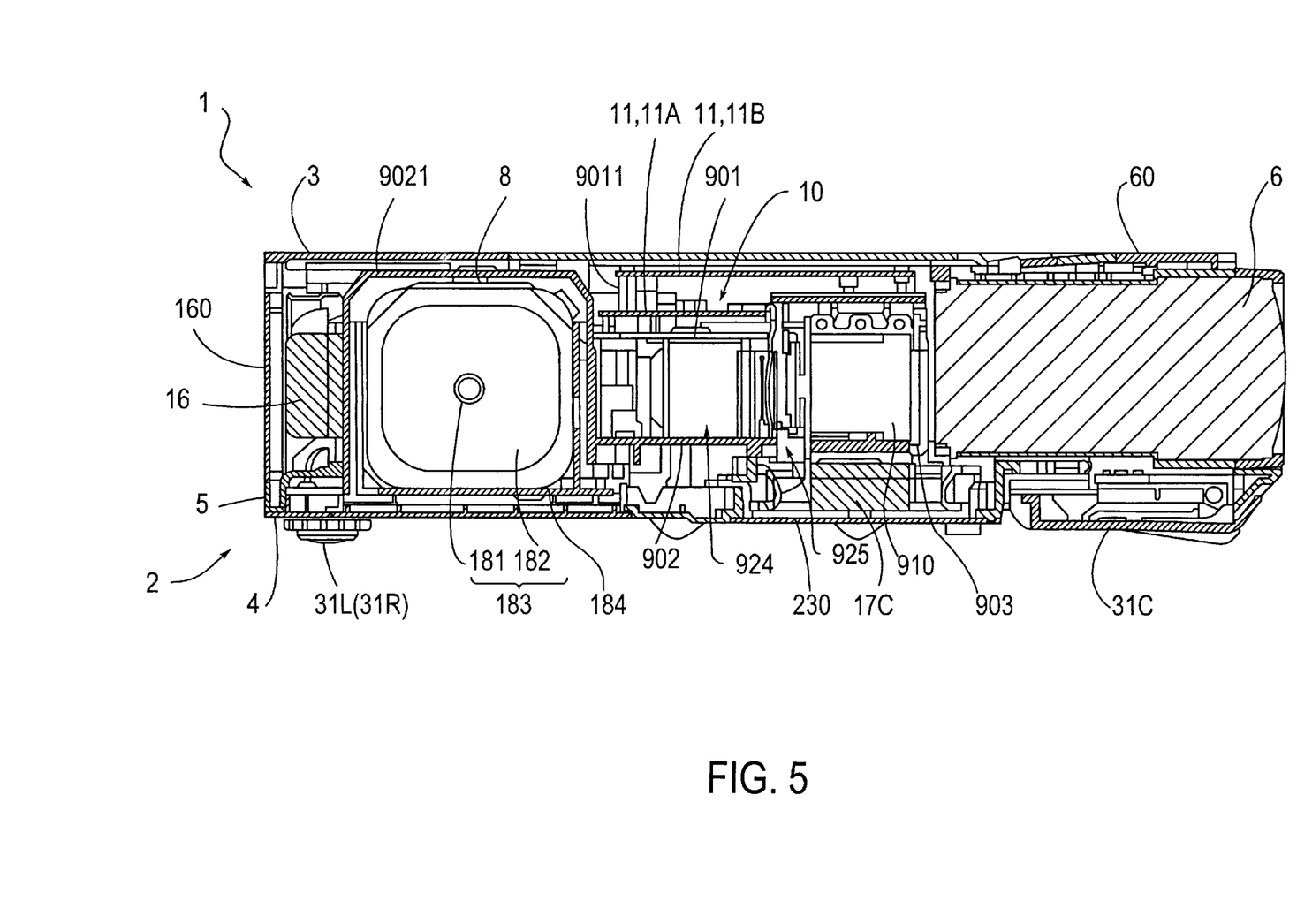
FIG. 5 is a vertical sectional view of the internal structure of the projection display device of the embodiment.

FIGS. 3 to 5 illustrate the internal structure of the projection display device 1. FIGS. 3 and 4 are perspective views of the projection display device interior, while FIG. 5 is a vertical sectional view of the projection display device 1.

As shown in these figures, within the outside case 2, an electrical power supply unit 7 serving as a power supply, a light source lamp unit 8, an optical unit 10 forming an optical system, a pair of upper and lower driver boards 11A and 11B serving as modulator driver boards, a main board 12 serving as control circuit board, and the like are disposed.

The electrical power supply unit 7 consists of first and second power supply blocks 7A and 7B disposed on both sides of a projection lens 6. The first power supply block 7A operates to change the pressure of the electrical power obtained through the AC inlet 50 and to supply the resulting electrical power mainly to the second power supply block 7B and the light source lamp unit 8. In addition to the power supply circuit board, on which contains a transformer, a rectifying circuit, a smoothing circuit, a voltage stabilizing circuit, or the like, the first power supply block 7A consists of a lamp driver board 18 used for driving a light source lamp 181 (described later) in the light source lamp unit 8. The lamp driver board 18 is covered by a transparent, resinous cover 185. The second power supply block 7B operates to further change the pressure of the electrical power obtained from the first power supply block 7A to supply the resulting electrical power. Like the first power supply block 7A, it consists of a power supply circuit board with a transformer and various circuits formed thereon, in addition to the transformer. The electrical power is supplied to another power supply circuit board 13 (indicated by dotted lines in FIG. 4) disposed below the optical unit 10, and to first and second intake fans 17A and 17B disposed adjacent to each of the power supply blocks 7A and 7B. The power supply circuit on the power supply circuit board 13 primarily operates to generate electrical power to drive a control circuit on the main board 12 based on the electrical power supplied from the second power supply block 7B. It also generates electrical power for the other low electrical power component parts. The second intake fan 17B is disposed between the second power supply block 7B and the projecting lens 6 in order to draw in cooling air from the outside to the inside of the projection display device through the gap between the projecting lens 6 and the upper case 3 (FIG. 1). The power supply blocks 7A and 7B are provided with a cover member 250A and a cover member 250B, respectively, which are formed of an electrically conductive material such as aluminum. Voice output speakers 251L and 251R are provided at their respective cover members 250A and 250B in correspondence with their respective holes 25L and holes 25R in the upper case 3. As shown in FIG. 4, the top portions of the cover members 250A and 250B are mechanically and electrically connected together by an electrically conductive, metallic plate 252U, while the bottom portions thereof are electrically connected by a metallic plate 252L (indicated by dotted lines in FIG. 2) and ultimately grounded through a GND (ground) line of the inlet 50. Of the metallic plates 252U and 252L, the metallic plate 252L is previously affixed to the lower case 4 formed of resinous material. The both ends of the metallic plate 252L are brought into contact with the bottom surfaces of cover members 250A and 250B by putting the power supply blocks 7A and 7B and lower case 4 together, and thereby achieving electrical conduction between cover members 250A and 250B.

The light source lamp unit 8 forms the light source section of the projection display device 1, and consists of a light source portion 183 consisting of a light source lamp 181 and a reflector 182, and a lamp housing 184 for accommodating the light source portion 183 therein. The light source lamp unit 8 is covered by an accommodating portion 9021, integrally formed with a lower light guide 902 (FIG. 5), and can be removed from the projection display device by opening the aforementioned lamp replacement cover 27. A pair of exhaust fans 16 are disposed horizontally side-by-side behind the accommodating portion 9021 in correspondence with the position of the exhaust port 160 in the rear case 5. As will be described later, the exhaust fans 16 cause the cooling air, drawn in by first to third fans 17A and 17C, to be drawn into the accommodating portion 9021 from an opening provided near the accommodating portion 9021. The exhaust fans 16 also cause the cooling air that has cooled the light source lamp unit 8 to be removed from the exhaust port 160. It is to be noted that the electrical power for the exhaust fans 16 is supplied from the power supply circuit board 13.

The optical unit 10 operates to optically treat the light beams emitted from the light source lamp unit 8 in order to form an optical image in accordance with image information, and consists of an illuminating system 923, a light separating system 924, a light modulating system 925, and a prism unit 910 serving as a light combining system. The optical elements of the optical unit 10 other than the light modulating system 925 and the prism unit 910 are interposed and supported between top and bottom light guides 901 and 902. The top light guide 901 and the bottom light guide 902 are integrally formed, and are affixed at the lower case 4 side with a screw. These light guides 901 and 902 are also affixed at the prism unit 910 side with a screw.

Figure 6:
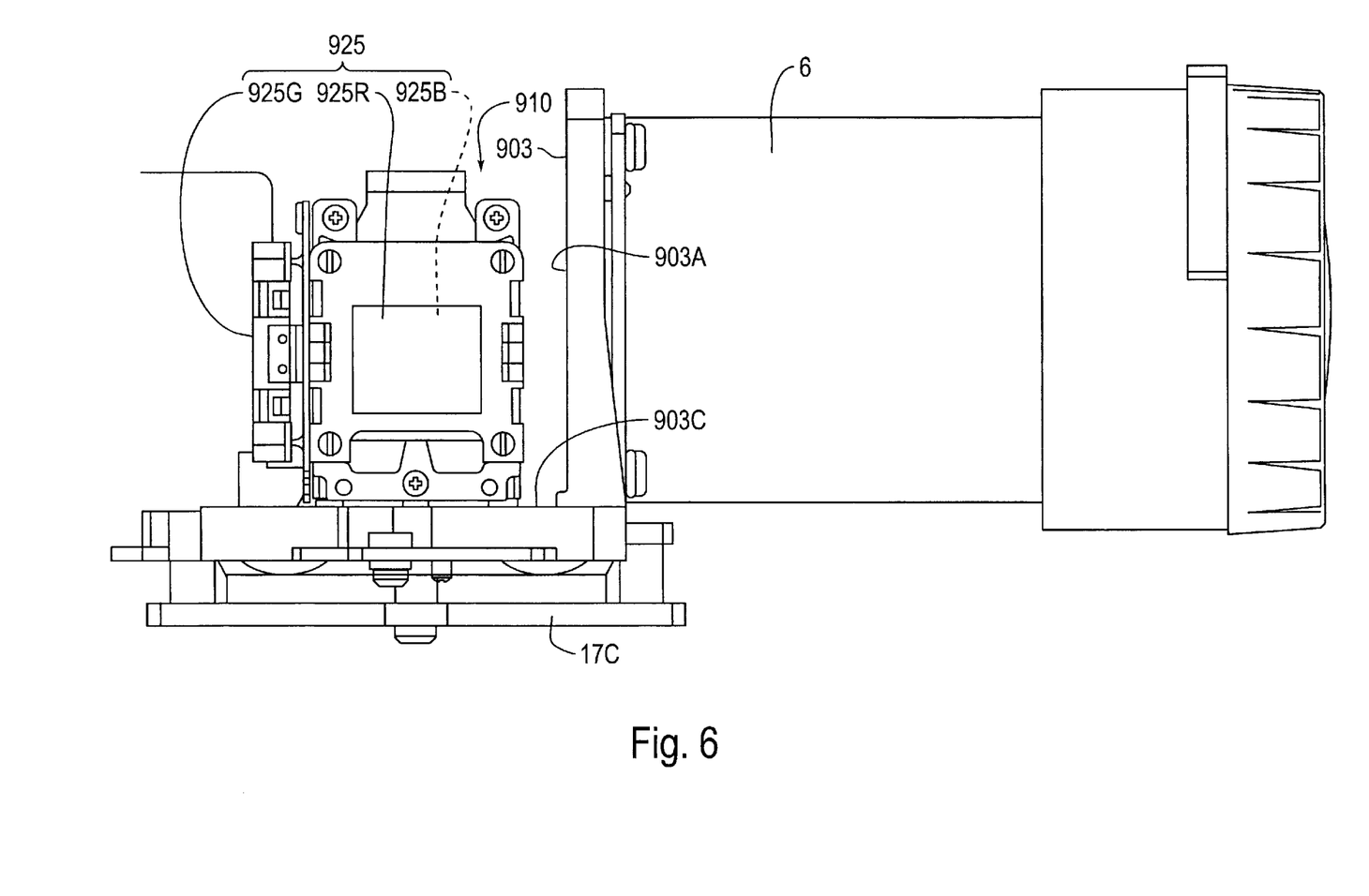
FIG. 6 is a vertical sectional view of the structure for mounting the light modulating system, the light combining system, and the projecting lens, in the embodiment.
Figure 7:
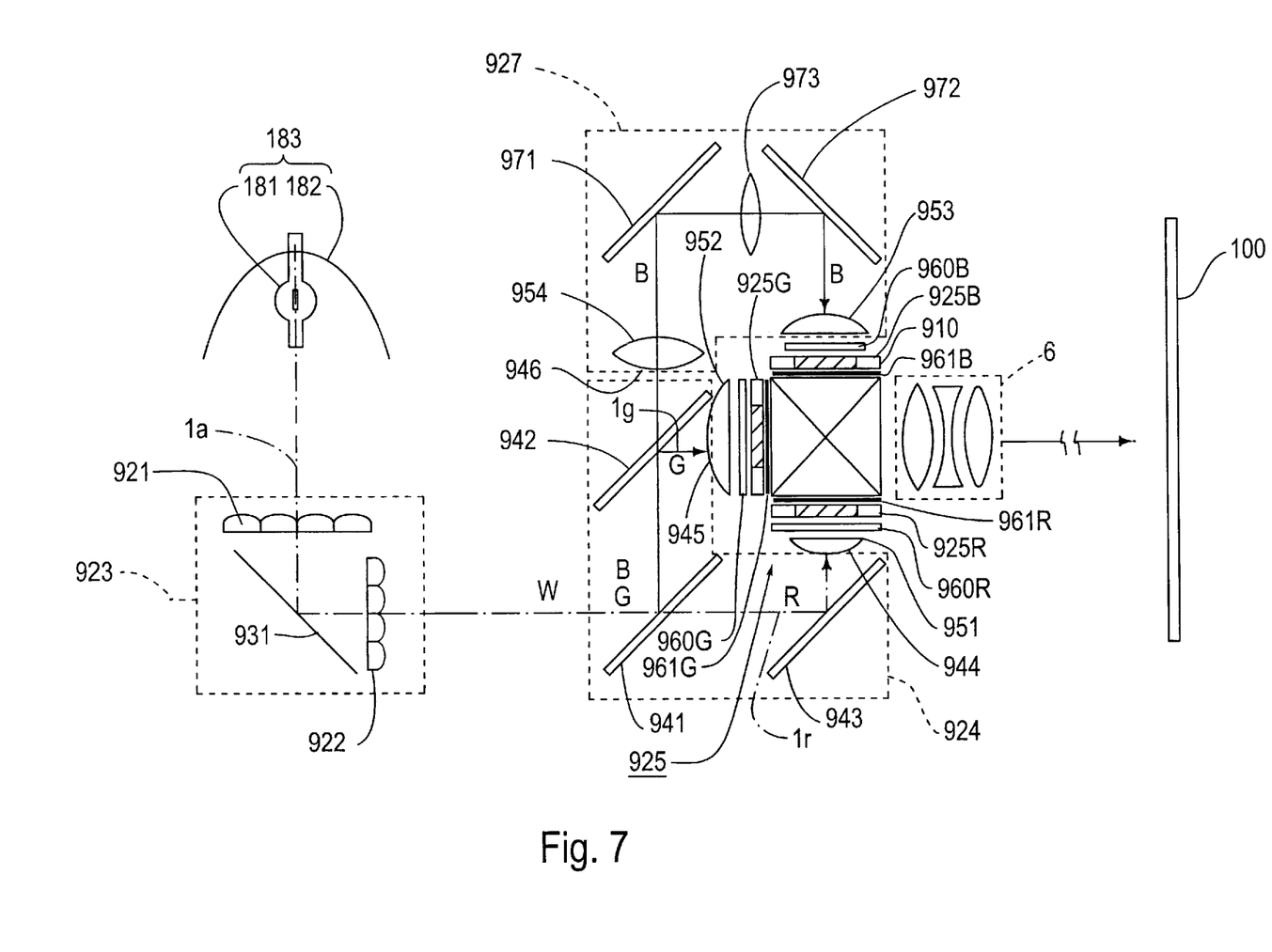
FIG. 7 is a schematic view of the structure of the optical system of the projection display device of the embodiment.

As shown in FIG. 6, the rectangular parallelepiped prism unit 910 is screwed and affixed to the back side of a head body 903 having a substantially L-shaped side face and being an integrally molded product of magnesium. Liquid crystal light valves 925R, 925G, and 925B, serving as light modulators of the light modulating system 925, are disposed in opposing relationship at three side surfaces of the prism unit 910. They are similarly screwed to the head body 903. It is to be noted that the liquid crystal light valve 925B is disposed so as to oppose the liquid crystal light valve 925R, with the prism unit 910 interposed therebetween (FIG. 7). In FIG. 6, the liquid crystal light valve 925B is indicated only by drawing dotted lines from the reference numeral designating it. The liquid crystal light valves 925R, 925G, and 925B are disposed at the lower surface of the head body 903, and are cooled by cooling air drawn in by the third intake fan 17C provided in correspondence with the aforementioned air intake 240. Here, the electrical power for the third intake fan 17C is supplied from the power supply circuit board 13 through a driver board 11 consisting of upper and lower driver boards 11B and 11A. The base end of the projecting lens 6 is screwed to the front surface of the head body 903. As shown in FIG. 5, the head body 903 having the prism unit 910 and the light modulating system 925 mounted thereto is screwed to the lower case 4.

The driver board 11 is used to drive and control the liquid crystal light valves 925R, 925G, and 925B of the aforementioned light modulating system 925, and is disposed above the optical unit 10. The lower driver board 11A and the upper driver board 11B are separated from each other by stud bolts 9011, with various elements (not shown) of a drive circuit or the like being mounted to opposing faces thereof. Many of the elements are efficiently cooled by the cooling air circulating in the aforementioned driver board 11. The cooling air, primarily drawn in by the third intake fan 17C, cools the liquid crystal light valves 925R, 925G, and 925B. Afterwards, the cooling air flows through an opening 904 (indicated by alternate long and two short dashed lines in FIG. 3) in the upper light guide 901 in order to flow within the aforementioned driver board 11.

The main board 12 has a control circuit formed thereon for controlling the entire projection display device 1, and is disposed in a standing manner at a side of the optical unit 10. In addition to being electrically connected to the driver board 11 and the operation switches 60, the main board 12 is electrically connected to a video board 15 and to an interface board 14 where the input and output terminal group 51 is provided, as well as to the power supply circuit board 13, through a connector or the like. The control circuit on the main board 12 is driven by the electrical power generated at the power supply circuit on the power supply circuit board 13, that is, by the electrical power from the second power supply block 7B. The main board 12 is cooled by cooling air flowing in from the second intake fan 17B through the second power supply block 7B.

In FIG. 3, a metallic guide member 19, formed of aluminum or the like, is disposed between the main board 12 and the outside case 2 (only the lower case 4 and the rear case 5 are shown in FIG. 3). The guide member 19 has a large planar portion 191 extending from the top end to the bottom end of the main board 12, with the top side thereof being affixed to the cover member 250B of the second power supply block 7B using a screw 192, and the bottom side thereof engaging, for example, a slit in the lower case 4 and being supported thereby. This prevents the upper case 3 (FIG. 1) and the main board 12 from interfering with each other when the upper case 3 is being mounted to the lower case 4, and protects the main board 12 from outside noise.

(4) Structure of the Optical System

A description will now be given of the structure of the optical system, that is, the optical unit 10 of the projection display device 1, with reference to the schematic view of FIG. 7.

As described above, the optical unit 10 consists of an illuminating system 923 for making the in-plane illuminance distribution of a light beam (W) coming from the light source lamp unit 8 uniform; a light separating system 924 for separating the light beam (W) emitted from the illuminating system 923 into a red light beam (R), a green light beam (G), and a blue light beam (B); a light modulating system 925 for modulating the color light beams, that is, the red light beam (R), the green light beam (G) and the blue light beam (B), in accordance with image information corresponding thereto; and a prism unit 910 serving as a light combining system for combining each of the modulated color light beams.

The illuminating system 923 includes a reflecting mirror 931 for bending an optical axis 1*a* of the light beam W emitted from the light source lamp unit 8 so that it extends toward the front of the projection display device 1; and a first lens plate 921 and a second lens plate 922 disposed such that the reflecting mirror 931 is interposed therebetween.

The first lens plate 921 composed of a plurality of rectangular lenses disposed in a matrix arrangement divides the light beam emitted from the light source into a plurality of partial light beams and causes the light beams to be gathered and concentrated near the second lens plate 922.

The second lens plate 922 composed of a plurality of rectangular lenses disposed in a matrix arrangement causes the light beams arriving from the first lens plate 921 to be superimposed on the liquid crystal light valves 925R, 925G, and 925B (described later) of the light modulating system 925.

Accordingly, the illuminating system 923 can substantially uniformly illuminate the liquid crystal light valves 925R, 925G, and 925B, so that the projection display device 1 of the present embodiment can provide a projection image that does not have uneven illuminance.

The light separating system 924 consists of a blue light and green light reflecting dichroic mirror 941, a green light reflecting dichroic mirror 942, and a reflecting mirror 943. At the blue light and green light reflecting dichroic mirror 941, the blue light beam (B) and the green light beam (G) of the light beam (W) emitted from the illuminating system 923 are reflected at right angles toward the green light reflecting dichroic mirror 942.

The red light beam (R) having passed through the blue light and green light reflecting dichroic mirror 941, is reflected at right angles by the reflecting mirror 943 disposed behind the blue light and green light reflecting dichroic mirror 941, exits a red light (R) outgoing portion 944, and travels toward the prism unit 910. Of the blue light beam (B) and the green light beam (G) reflected by the blue light and green light reflecting dichroic mirror 941, only the green light beam (G) is reflected at a right angle by the green light reflecting dichroic mirror 942, exits a green light (G) outgoing portion 945, and travels toward the prism unit 910. The blue light beam (B), which has passed through the green light reflecting dichroic mirror 942, exits a blue light (B) outgoing portion 946, and travels toward light guiding system 927. In the present embodiment, the distances from the light beam (W) outgoing portion of the illuminating system 923 to each of the light outgoing portions 944, 945, and 946 of the light separating system 924 are all the same.

A light condenser lens 951 and a light condenser lens 952 are disposed at the red light (R) outgoing portion 944 and the green light (G) outgoing portion 945 of the light separating system 924, respectively. Accordingly, the red light beam (R) and the green light beam (G), which have exited their respective light-outgoing portions, enter their respective light condenser lenses 951 and 952 in order to be formed into parallel light beams.

The red light beam (R) and the green light beam (G), which have been collimated, pass through respective light-incoming side polarizing plates 960R and 960G, and enter their respective liquid crystal light valves 925R and 925G, where they are modulated, in order to add the image information corresponding to these colors. In other words, these liquid crystal light valves 925R and 925G are controlled by switching in accordance with the image information associated thereto, by the aforementioned driver board 11, whereby the color light beams, which pass through their respective liquid crystal light valves, are modulated. The blue light beam (B) is led, through the light guiding system 927, to the liquid crystal light valve 925B, where it is similarly modulated in accordance with the image information corresponding thereto. For the liquid crystal light valves 925R, 925G, and 925B, a liquid crystal light valve, which utilizes a polysilicon TFT as a switching element, may be used.

The light guiding system 927 consists of a condenser lens 954 disposed at the light-outgoing side of the blue light (B) outgoing portion 946; a light-incoming side reflecting mirror 971; a light-outgoing side reflecting mirror 972; an intermediate lens 973 disposed between these reflecting mirrors; and a light condenser lens 953 disposed behind the liquid crystal light valve 925B. The blue light beam (B), which has exited the light condenser lens 953, passes through a light-incoming side polarizing plate 960B, and enters the liquid crystal light valve 925B that modulates it. Here, the optical axis 1a of the light beam W and optical axes 1r, 1g, and 1b of the respective color light beams R, G, and B are formed so as to lie in the same plane. The length of the optical path, that is the distance from the light source lamp 181 to a liquid crystal light valve, is longest for the blue light beam (B), so that the loss of quantity of light is largest in blue light. However, the light guiding system 927 reduces the amount of loss.

The light beams R, G, and B, which have been modulated as a result of passing through their respective liquid crystal light valves 925R, 925G, and 925B, pass through their respective light-outgoing side polarizing plates 961R, 961G, and 961B, and enter the prism unit 910, where they are combined together. This results in the formation of a color image, which, through the projection lens 6, is projected in enlarged form onto a projection surface 100 disposed at a predetermined location.

(5) Cooling Paths

A description will now be given of cooling paths formed in the projection display device 1.

A first power supply block cooling path 41, a second power supply block cooling path 42, a light modulating system cooling path 43, and a light source cooling path 44 are, in general, formed in the projection display device 1, as indicated schematically by arrows in FIGS. 1 and 2. The cooling air does not circulate exactly as indicated by the arrows representing the cooling paths 41 to 44 in the projection display device, but only approximately by making its way through the gaps between the component parts, as shown by the arrows.

The first power supply block cooling path 41 allows passage of cooling air drawn in from an intake 171 by the first intake fan 17A (FIGS. 3 and 4). After cooling the first power supply block 7A, the cooling air cools the lamp driver board 18 disposed behind the first power supply block 7A. Here, the cooling air circulates within the resinous cover 185 with openings provided at the front and rear ends thereof, so that the flow of the cooling air is restricted to that in one direction, thereby ensuring maintenance of the flow rate required for cooling the lamp driver board 18. Thereafter, the cooling air flows into the accommodating portion 9021 from an opening 9022, at the top side of the accommodating portion 9021, or from another gap or opening that is not shown, whereby the light source lamp unit 8 (or the light source lamp 181) disposed therein is cooled, after which the cooling air is removed from the exhaust port 160 by the exhaust fans 16.

The second power supply block cooling path 42 allows passage of cooling air drawn in by the second intake fan 17B. After cooling the second power supply block 7B, the cooling air cools the main board 12 disposed behind the second power supply block 7B, and then flows into the accommodating portion 9021 from, for example, an opening 9023 disposed adjacent thereto in order to cool the light source lamp unit 8, after which the cooling air is removed from the exhaust port 160 by the exhaust fans 16.

The light modulating system cooling path 43 allows passage of cooling air drawn in by the third intake fan 17C shown in FIGS. 5 and 6. As described above, after cooling the liquid crystal light valves 925R, 925G, and 925B, the cooling air flows through the opening 904 in the upper light guide 901, directly thereabove, and circulates between the opposing faces of the upper and lower driver boards 11A and 11B in order to flow along the opposite surfaces of driver boards 11A and 11B and travel toward the back side of the projection display device. In other words, the light modulating system cooling path 43 is partly formed by the driver boards 11A and 11B, so that the elements mounted on the faces opposite to the light modulating system cooling path 43 are efficiently cooled. The cooling air passes through an opening 9024, in addition to through the openings 9022 and 9023, in order to flow into the accommodating portion 9021 and cool the light source lamp unit 8, after which it is similarly removed from the exhaust port 160.

The light source cooling path 44 allows passage of cooling air drawn in from an intake 172 (FIG. 2) provided at the bottom surface of the lower case 4. The cooling air is drawn into the projection display device from the intake 172 by the exhaust fans 16, and flows into the projection display device from an opening or gap formed at the bottom surface of the accommodating portion 9021 in order to cool the component parts of the illuminating system 923, after which it cools the light source lamp unit 8 and is removed from the exhaust port 160.

The cooling air which flows along the cooling paths 41 to 44 is removed from the exhaust port 160 by the exhaust fans 16, which are controlled in accordance with the temperature of the heated component parts. A temperature sensor 9025, covered by a shrink tube or the like, is provided near the opening 9022 adjacent to the light source lamp unit 8 where the temperature tends to rise; and a similar temperature sensor (not shown) is provided near the lens plate 922 (FIG. 4), disposed below the opening 9023, as well as near the first and second power supply blocks 7A and 7B and near the liquid crystal light valves 925R, 925G, and 925B. These temperature sensors 9025 provided in the cooling paths 41 to 44 output electrical signals to the main board 12 through, for example, the power supply circuit board 13. Then, at the main board 12, the output electrical signals are electrically processed in order to detect the temperature of the cooling air or any heated component part. When a high temperature is detected, both exhaust fans 16 are driven at the same time in order to positively carry out cooling operations, whereas when a low temperature is detected, only one of the exhaust fans 16 is driven in order to carry out control operations so as to save electrical power.

(6) Advantages Provided by the Embodiment

According to the embodiment, the following advantages are provided.

1) In the projection display device 1, the power supply unit 7, which is a relatively large compared to the other component parts of the projection display device 1, is formed so as to be divided into small first and second power supply blocks 7A and 7B, which are separated from each other. Since the power supply blocks 7A and 7B are efficiently disposed in the projection display device 1, dead space is not easily formed in the projection display device 1, making it possible to reduce the size of the projection display device 1.

2) The first and second power supply blocks 7A and 7B, and the liquid crystal light valves 925R, 925G, and 925B generate heat easily compared to the other component parts. However, the first power supply block cooling path 41 and the second power supply block cooling path 42 are provided for the first power supply block 7A and the second power supply block 7B, respectively; and the light modulating system cooling path 43 is provided for the liquid crystal light valves 925R, 925G, and 925B. Therefore, even when these component parts are disposed close together in the projection display device 1, they can be properly cooled, making it possible to increase the cooling efficiency of the entire projection display device 1.

3) Cooling air can be circulated in the cooling paths 41 to 43 by, for example, driving only the exhaust fan 16. In the embodiment, however, intake fans 17A to 17C are provided at the cooling paths 41 to 43, respectively, so that a sufficient amount of cooling air can be drawn into the cooling paths 41 to 43 in order to cause it to circulate therein, thereby ensuring cooling operations.

4) At the back side of the projection display device 1, the power supply block cooling paths 41 and 42 and the light modulating system cooling path 43 are formed so as to pass by the light source lamp unit 8 (light source lamp 181), so that, compared to the case where only the light source cooling path 44 is provided, the light source lamp unit 8, which is most easily heated to a high temperature, can be effectively cooled.

5) The lamp driver board 18, used for driving the lamp 181, is disposed in the first power supply block cooling path 41. The main board 12, used for controlling the entire projection display device 1, is disposed in the second power supply block cooling path 42. The driver board 11, used for driving the liquid crystal light valves 925R, 925G, and 925B, is disposed in the light modulating system cooling path 43. Therefore, these component parts can be properly cooled, thereby eliminating the problem of circuit malfunction, and thus making the projection display device 1 more reliable.

6) In the first power supply block cooling path 41, in particular, the cooling air circulates within the resinous cover 185, so that the lamp driver board 18 can be more reliably cooled while maintaining the flow rate of the cooling air.

7) A space, which is formed between the pair of driver boards 11A and 11B, forms part of the light modulating system cooling path 43, so that the flow rate of the cooling air circulating therebetween can be reliably maintained. Therefore, elements mounted onto the faces opposite to the light modulating system cooling path 43 can be efficiently cooled, so that a circuit malfunction occurs less frequently, making it possible to make the projection display device 1 more reliable.

8) The exhaust fans 16 are controlled based on the detection performed by the temperature sensors 9025 provided in the cooling paths 41 to 43, so that precise and economical cooling operations can be carried out depending on the heated condition of the elements, by driving both exhaust fans 16 at the same time, or by changing the supply voltage to the exhaust fans 16, or by driving only one exhaust fan 16.

9) By providing a pair of exhaust fans 16, smaller exhaust fans can be used. This means that the size of the fans, particularly, in the axial direction, becomes smaller than that of one equivalent fan capable of performing the operations of two exhaust fans 16, so that the front-to-back dimensions of the projection display device 1 can be made smaller, thereby making it easier to achieve size reduction.

The present invention is not limited to the above-described embodiment, so that various modifications, such as those described below, can be made in, for example, the structure of the projection display device as long as it allows achievement of the above-described object.

Although in the above-described embodiment a pair of exhaust fans 16 are used, one exhaust fan 16 or three or more exhaust fans 16 may be used. However, from the point of view of advantages 8) and 9), it is preferable to use at least two exhaust fans 16.

Although in the above-described embodiment the cooling paths 41 to 43 are formed so as to pass by the light source lamp unit 8 (the light source lamp 181), they may be formed such that any one of or none of the cooling paths 41 to 43 passes by the light source lamp unit 8. From the point of view of advantage 4), it is preferable to make them pass by the light source lamp unit 8, as in the above-described embodiment.

Although in the above-described embodiment upper and lower driver boards 11A and 11B are provided to allow the cooling air to circulate therebetween, only one driver board may be formed to reduce driver board size.

Although the driver board 11, the main board 12, and the lamp driver board 18 are disposed in the cooling paths 41 to 43, they may disposed in the cooling paths 41 to 43 depending on the necessity.

Although intake fans 17A to 17C are disposed at their respective cooling paths 41 to 43, cooling air can be drawn in and removed from all of the cooling paths by an exhaust fan, just as it is drawn in and removed from the light source cooling path 44 by the exhaust fan. In short, all that is required in the present invention is that separate cooling paths be formed at each of the power supply blocks and the light modulating system, regardless of whether or not an intake fan is provided.

As can be understood from the foregoing description, according to the present invention, the power supply, which is relatively large compared to the other component parts of the projection display device, is formed so as to be divided into a plurality of small power supply blocks, which can be efficiently disposed in the projection display device. Therefore, dead space is not easily formed in the projection display device, making it possible to reduce the size of the projection display device. The power supply blocks and, in particular, the light modulating system of the optical system tends to generate heat compared to the other component parts. By forming a cooling path for each power supply block, and a cooling path for the light modulating system, they can be properly cooled, so that the entire projection display device can be cooled more efficiently.

What is claimed is:

1. A projector, comprising:
    a light source;
    an optical system including a light modulating system that modulates light beams emitted from the light source to form an optical image in accordance with image information;
    a projecting lens that projects the optical image formed by the optical system in enlarged form;
    a power supply that supplies electrical power to drive the projector, the power supply including a plurality of spaced apart power supply blocks; and
    an exterior case that covers almost all of the projector.

2. The projector according to claim 1, the plurality of power supply blocks being disposed at at least both sides of the projecting lens.

3. The projector according to claim 1, one of the plurality of power supply blocks supplying electrical power to the light source, and another power supply block supplying electrical power to a control circuit that controls the optical system.

4. The projector according to claim 1, each of the power supply blocks including a cover member that has conductive properties, the cover members being electrically connected to each other and connected to ground.

5. The projector according to claim 4, further comprising at least two straddling members that electrically connect tops and bottoms of the cover members.

6. The projector according to claim 4, the straddling members being attached to an inner face of the exterior case, and each of the straddling members including a contact portion that contacts the cover members, the contact portion electrically connecting the cover members with assembling the exterior case.

7. The projector according to claim 6, the contact portion having spring properties.

* * * * *